Dec. 2, 1969  TAKASHI HIGUCHI  3,481,666
FOUR COMPONENT ZOOM LENS

Filed Aug. 20, 1968  3 Sheets-Sheet 1

INVENTOR.
TAKASHI HIGUCHI
BY
ATTORNEY

INVENTOR.
TAKASHI HIGUCHI

FIG. 4

United States Patent Office 3,481,666
Patented Dec. 2, 1969

3,481,666
FOUR COMPONENT ZOOM LENS
Takashi Higuchi, Yokohama-shi, Japan, assignor to Nippon Kogaku K.K., Tokyo, Japan, a corporation of Japan
Continuation-in-part of application Ser. No. 389,167, Aug. 12, 1964. This application Aug. 20, 1968, Ser. No. 756,347
Claims priority, application Japan, Aug. 27, 1963, 45,077
Int. Cl. B29d *15/00;* G02b *9/00*
U.S. Cl. 350—184                          3 Claims

ABSTRACT OF THE DISCLOSURE

Zoom lens of high magnification comprising four components in which the first and third components are positive and movable as a unit while the second component is negative and move oppositely; the fourth component being either positive or negative and remaining fixed. Zoom lenses having a variable focal length of 7.5 mm.–45.3 mm. with an aperture ratio of F:1.4; a variable focal length of 13.3 mm.–161.8 mm. and an aperture ratio of F:2.5; and a variable focal length of 51.6 mm.–300 mm. and an aperture ratio of F:4.5, are provided.

---

This application is a continuation-in-part of the application Ser. No. 389,167 filed Aug. 12, 1964, which is now abandoned.

This invention relates to a zoom lens having a large aperture and a wide range of zoom ratio.

Many conventional cine-zoom objectives are of a type where the zoom unit comprises three components, a positive, a negative and a positive, of which the second and negative component is mainly moved for relative magnification performance, and the resultant displacement of the focus is compensated for by slightly moving a part of either the first or third positive component. In this type of zoom objective, since the second and negative component is almost entirely made responsible for the relative magnification performance, this component must be designed to have relatively a fairly short focal length even in obtaining one and the same otherwise available relative magnification or zoom ratio. Furthermore, since this component has to make a good amount of movement tending to increase the aberrations afresh in operation, this type may hardly be deemed as of a satisfactory optical performance.

The present invention enables the production of large aperture zoom objectives of high magnification without increasing the total length or enlarging the shape of lens system thereof by uniformly distributing to each lens component the burden of the magnification performance.

A large aperture zoom lens in accordance with the invention comprises four components, a first positive, a second negative, a third positive and a fourth fixed component and the first three components thereof constitute the inventive zoom unit, in which the first and third positive components being movable as a unit while the second and negative component is moved in the opposite direction thereto.

Prior known is a zoom lens in which the first and third positive components are movable at both sides of the fixed second negative component, as also a type wherein the second negative component is mainly moved whilst the third positive component is separately moved. In these types, however, no surprising widening of the range of zoom ratio may be expected without greatly shortening the focal length of the second negative component and significantly sacrificing the optical performance.

In accordance with the invention, the second negative component is moved and simultaneously the first positive component, which is also made responsible for the zooming effect, and is moved together with the third positive component as a unit so that no involved moving mechanism is required for the movable components, and yet, maximum relative magnification is available for this optical system. Thus a zoom objective of excellent optical performance throughout the entire range of focussing is obtained.

Other objects, advantages and features of this invention will become more apparent from the following description of an illustrative embodiment in conjunction with the drawing in which.

Figure 1:
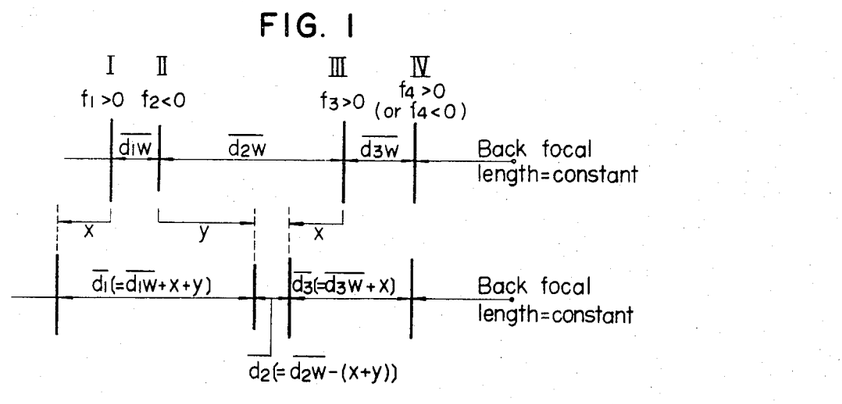
FIGURE 1 is a diagram illustrative of the fundamental design of the zoom objective in accordance with the invention.

The design of the inventive zoom objective will be described with reference to an illustrative embodiment which follows. Referring to FIGURE 1, focal lengths of the first positive, the second negative, the third positive and the fourth fixed components are denoted by $f_1$, $f_2$, $f_3$ and $f_4$, respectively, and from a reference point the first and the third positive components are movable, as a unit, through distance $x$, while the second negative component is movable through distance $y$ in the direction opposite to that of such unit. The resultant distances of the principal planes of respective lens components are represented by $\overline{d_1}$, $\overline{d_2}$ and $\overline{d_3}$, respectively. The system enables continuous magnification while focussing is always obtained at a definite and fixed position.

The relationship between distances $x$ and $y$ will be shown below. Now assume that the position at which the composite focal length $f$ is the shortest is the reference and that in this reference position, the distances between the principal plates for the respective components are $\overline{d_{1w}}$, $\overline{d_{2w}}$ and $\overline{d_{3w}}$, respectively. Also for this reference position, assume the distance between the image point formed by two components, namely, the first positive component and the second negative component, of an object point at infinity, and the second negative component is $b_{1w}$, and, likewise, the distance between the image point of an object point at infinity formed by all three components, namely the first positive, the second negative and the third positive components, and the third positive component is $b_{2w}$, there are obtained the following equations:

$$b_{1w} = \frac{f_2(\overline{d_{1w}} - f_1)}{(\overline{d_{1w}} - f_1) - f_2} \quad (1)$$

$$b_{2w} = \frac{f_3(\overline{d_{2w}} - b_{1w})}{(\overline{d_{2w}} - b_{1w}) - f_3} \quad (2)$$

Since $$\overline{d_1} + \overline{d_2} = \text{constant} \quad (3)$$

any given $\overline{d_1}$ automatically determines $\overline{d_2}$. So also $b_1$ and $b_2$ may be obtained like Equations 1 and 2, their values being:

$$b_1 = \frac{f_2(\overline{d_1} - f_1)}{(\overline{d_1} - f_1) - f_2} \quad (4)$$

$$b_2 = \frac{f_3(\overline{d_2} - b_1)}{(\overline{d_2} - b_1) - f_3} \quad (5)$$

In order to obtain the focal plane any time at a definite point, it is necessary to satisfy the following Equations 6 and 7:

$$x = b_2 - b_{2w} \quad (6)$$
$$y = \overline{d_{2w}} - \overline{d_2} - x \quad (7)$$

It follows from the foregoing that it is possible to have a wide range continuous magnification operation, as well as the focal plane free from displacement from a definite spatially fixed position by moving (a) the first and the third positive components as a unit by the distance $x$, and (b) the second negative component by the distance $y$ in the direction opposite that of the movement of said unit when the following conditions are satisfied:

$$\overline{d_1} = \overline{d_{1w}} + x + y \quad (8)$$
$$\overline{d_2} = \overline{d_{2w}} - (x + y) \quad (9)$$

and $$\overline{d_3} = \overline{d_{3w}} + x \quad (10)$$

Figure 2:
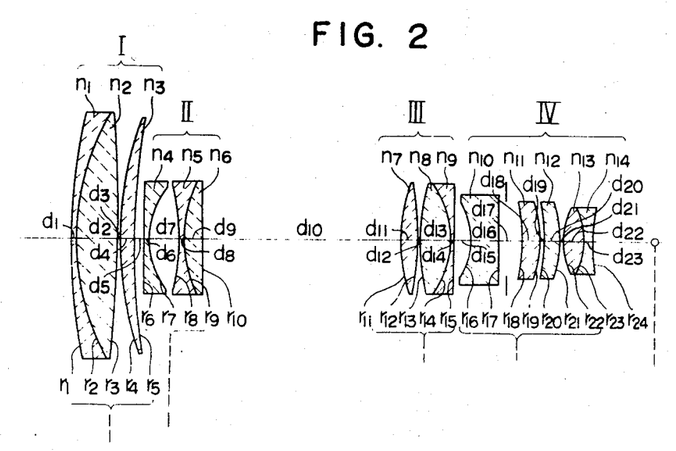
FIGURE 2 is a sectional view of an illustrative embodiment of the invention.
Figure 3:
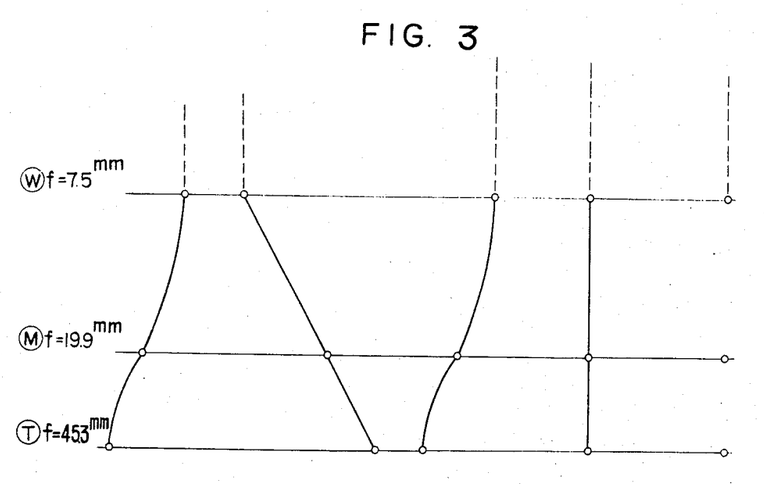
FIGURE 3 is a cam diagram showing the movement of each component of the illustrative embodiment of the invention of FIG. 2 (in which the second component is moved linearly)
Figure 5:
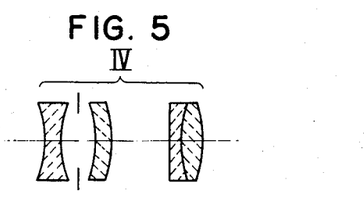
FIGURE 5 is a sectional view of another embodiment of the fourth component which is negative and may take the place of that shown in FIGURE 2.

Viewed basically, the first positive, the second negative and the third positive components constitute an inventive zoom unit while a fourth positive (or negative) component enables modification of the overall optical system to have a suitable range of focal lengths, and functions to correct to the best condition the aberrations produced by the zoom unit. The fourth fixed component is made positive when the desired range of overall focal lengths is smaller than the range of focal lengths obtainable by the first, second and third components, while it is made negative when the desired range of overall focal length is larger than the range of focal length obtainable by the first, second and third components. In FIG. 2, the fourth component is represented as positive, while FIG. 5 shows a fourth fixed and negative component.

As previously mentioned, the uniform distribution of the responsibilities for the zooming effect among the first three components works to minimize aberration changes in the zooming operation, and furthermore, chromatic aberration is fully removed by making all the components achromatic.

In the condition of what is called a "telephoto" lens where the focal length of the objective becomes the longest, as the first positive component advances, light rays considerably converged by the first positive component are received by the second negative component thereby making it feasible to prevent over-correction of spherical aberration without enlarging the lens shape, and thus the production of a large aperture zoom objective becomes possible.

For effectively compensating not only for spherical aberration but for astigmatism, coma, curvature of image field and distortion, and furthermore for attaining the most significant zooming effect of the optical system, the following conditions are essential:

$$3.1|f_2| < f_1 < 5.4|f_2| \quad (11)$$
$$0.9|f_2| < f_3 < 1.6|f_2| \quad (12)$$

at the largest focal length, satisfying the following conditions:

$$0.9f_3 < \overline{d_1} + \overline{d_2} < 2.9f_3 \quad (13)$$
$$0.3(\overline{d_1} + \overline{d_2}) < x + y < 0.8(\overline{d_1} + \overline{d_2}) \quad (14)$$
$$x > 0.2y \quad (15)$$

These conditions 11 to 15 are the structural limitations for obtaining a high magnification in zoom system with an excellent focusing of the image and the significance of these conditions are explained below in the way that if respective conditions are not satisfied the zoom system becomes inoperative.

If $f_1$ does not satisfy condition 11 as given:

When $3.1|f_2| > f_1$, the first and third components must move in the same direction as that of the second component as the second component moves so that the zooming effect shall be negated. On the other hand, when $f_1 > 5.4|f_2|$, the second component can hardly be moved relative to the movements of the first and third components so that the zooming effect cannot be increased. And consequently condition 11 must be satisfied.

If $f_3$ does not satisfy condition 12:

When $0.9|f_2| > f_3$, the small movements of the first and third components become very small relative to the movement of the second component so that the first and third only play the role of corrective components. Furthermore, $f_3$ becomes too small that the balance of aberrations at the long focal length is broken and especially the spherical aberration is increased. On the other hand, when $f_3 > 1.6|f_2|$, the movement of the second component in the direction opposite to the direction of the movements of the first and third components is significantly decreased so that the zoom ratio becomes small. Furthermore, $f_3$ becomes large and consequently the composite focal length $f$ from the first through third components becomes large so that the burden of correction of aberrations subjected to the fourth component (master lens) which is to correct the said composite focal length $f$ to be a suitable value is increased and the correction of aberrations is deteriorated, and consequently, the condition of $0.9|f_2| < f_3 < 1.6|f_2|$ must be satisfied.

Next if $\overline{d_1} + \overline{d_2}$ does not satisfy condition 13:

When $0.9f_3 > \overline{d_1} + \overline{d_2}$, the air spaces between respective components are narrow so that the movable distances of the lens components become small and the zoom lens is limited to have a small zoom ratio. On the other hand, when $\overline{d_1} + \overline{d_2} > 2.9f_3$, the zoom ratio can theoretically be increased, but since the first and third components become substantially immovable and the zooming operation is made only by the second component so that the burden upon the second component is greatly increased. Especially, spherical aberration is overcorrected at the long focal length and the curvature of image surface due to the difference in the focal length shall become unbalanced. Consequently it is necessary to satisfy the condition of $0.9f_3 < \overline{d_1} + \overline{d_2} < 2.9f_3$.

If $x + y$ does not satisfy condition 14:

When $0.3(\overline{d_1} + \overline{d_2}) > x + y$, the distances of the movement of $x$ and $y$ become small which is adverse to the object of the present invention to increase zoom ratio. On the other hand, when $x + y > 0.8(\overline{d_1} + \overline{d_2})$, it is theoretically possible to increase zoom ratio, but the air spaces between respective lens components become minus which is not practical. Therefore, $0.3(\bar{d_1}+\bar{d_2}) < x+y < 0.8(\bar{d_1}+\bar{d_2})$ must be satisfied.

Finally, if $x$ does not satisfy $x > 0.2y$ as given in condition 15:

When $x < 0.2y$, the zooming operation is mainly made by the movement of the second component while the first and third components are only moved slightly auxiliarily, which is adverse to the object of the present invention to move the first and third components in opposite direction to the movement of the second component to obtain high magnification ratio. Therefore, $x > 0.2y$ is a necessary condition.

Furthermore, the inventive system contemplates that the first positive component consists of a cemented positive doublet, of a divergent lens and a convergent lens, and a single convergent lens, and by this arrangement, the over-correction of spherical aberration at the side of a long focal length is prevented and at the same time chromatic aberration is improved. And moreover, the balance of curvatures of image surfaces at the shortest and longest focal lengths is also corrected. The second negative component consists of a divergent lens and a cemented negative doublet of a divergent and convergent lenses and by this arrangement, the minus barrel distortion at the side of short focal length is prevented and at the same time unbalance of astigmatism is improved. The third component consists of not more than two inclusive bi-convex lenses and a cemented positive doublet of a convergent and a divergent lenses viewing from the light progressing direction, and by this arrangement, the curving to a minus of the image surface at an intermediate focal length is prevented and simultaneously coma aberration is improved.

According to these arrangements, the present invention provides a zoom lens having excellently corrected aberrations over the whole zoom range.

The specific illustrative embodiments of the present invention are as follows:

An 8-mm. cine-zoom objective:
where

EXAMPLE 1

[F: 7.5 mm.–45.3 mm.; F: 1.4; Zoom ratio 6]

| Component with focal length | Radius of curvature | Lens thickness or air space | | | Index of refraction | Abbé number |
|---|---|---|---|---|---|---|
| | | W | M | T | | |
| I ($f_1$ 79.65) | $r_1=+98.380$ | $d_1=1.0$ | | | $n_1=1.76182$ | $v_1=26.5$ |
| | $r_2=+42.444$ | $d_2=7.5$ | | | $n_2=1.65830$ | $v_2=57.3$ |
| | $r_3=-2681.150$ | $d_3=0.1$ | | | | |
| | $r_4=+63.030$ | $d_4=2.5$ | | | $n_3=1.65830$ | $v_3=57.3$ |
| | $r_5=+117.590$ | $d_5=1.46$ | 22.59 | 36.66 | | |
| II ($f_2$ −18.17) | $r_6=+339.000$ | $d_6=1.0$ | | | $n_4=1.69113$ | $v_4=$. |
| | $r_7=+15.900$ | $d_7=5.5$ | | | | |
| | $r_8=-30.500$ | $d_8=0.6$ | | | $n_5=1.51690$ | $v_5=64.2$ |
| | $r_9=+18.300$ | $d_9=3.2$ | | | $n_6=1.72825$ | $v_6=28.3$ |
| | $r_{10}=+133.239$ | $d_{10}=36.24$ | 15.11 | 1.04 | | |
| III ($f_3$ 23.12) | $r_{11}=+39.500$ | $d_{11}=2.5$ | | | $n_7=1.65866$ | $v_7=57.5$ |
| | $r_{12}=-109.500$ | $d_{12}=0.1$ | | | | |
| | $r_{13}=+39.500$ | $d_{13}=6.0$ | | | $n_8=1.65866$ | $v_8=57.5$ |
| | $r_{14}=-14.500$ | $d_{14}=0.8$ | | | $n_9=1.72479$ | $v_9=37.9$ |
| | $r_{15}=-71.313$ | $d_{15}=2.0$ | 9.21 | 14.79 | | |
| IV ($f_4$ 18.62) | $r_{16}=-18.200$ | $d_{16}=6.0$ | | | $n_{10}=1.57501$ | $v_{10}=41.3$ |
| | $r_{17}=\infty$ | $d_{17}=3.5$ | | | | |
| | $r_{18}=-64.559$ | $d_{18}=3.5$ | | | $n_{11}=1.62041$ | $v_{11}=60.3$ |
| | $r_{19}=-23.000$ | $d_{19}=0.1$ | | | | |
| | $r_{20}=-64.559$ | $d_{20}=3.5$ | | | $n_{12}=1.62041$ | $v_{12}=60.3$ |
| | $r_{21}=-23.000$ | $d_{21}=0.1$ | | | | |
| | $r_{22}=+15.500$ | $d_{22}=4.0$ | | | $n_{13}=1.58938$ | $v_{13}=61.3$ |
| | $r_{23}=-12.500$ | $d_{23}=1.4$ | | | $n_{14}=1.69895$ | $v_{14}=30.1$ |
| | $r_{24}=+184.974$ | | | | | |

$r_1, r_2 \ldots r_{24}$ denote radii of curvature of despective lenses from object to image side;

$d_1, d_2 \ldots d_{23}$ thickness of and air spacings between respective lenses along the optical axis in said order;

$n_1, n_2 \ldots n_{14}$ refractive indices of respective glass materials for the D line of spectrum in said order;

$v_1, v_2 \ldots v_{14}$ Abbe numbers for said glass materials in said order.

Figure 4:
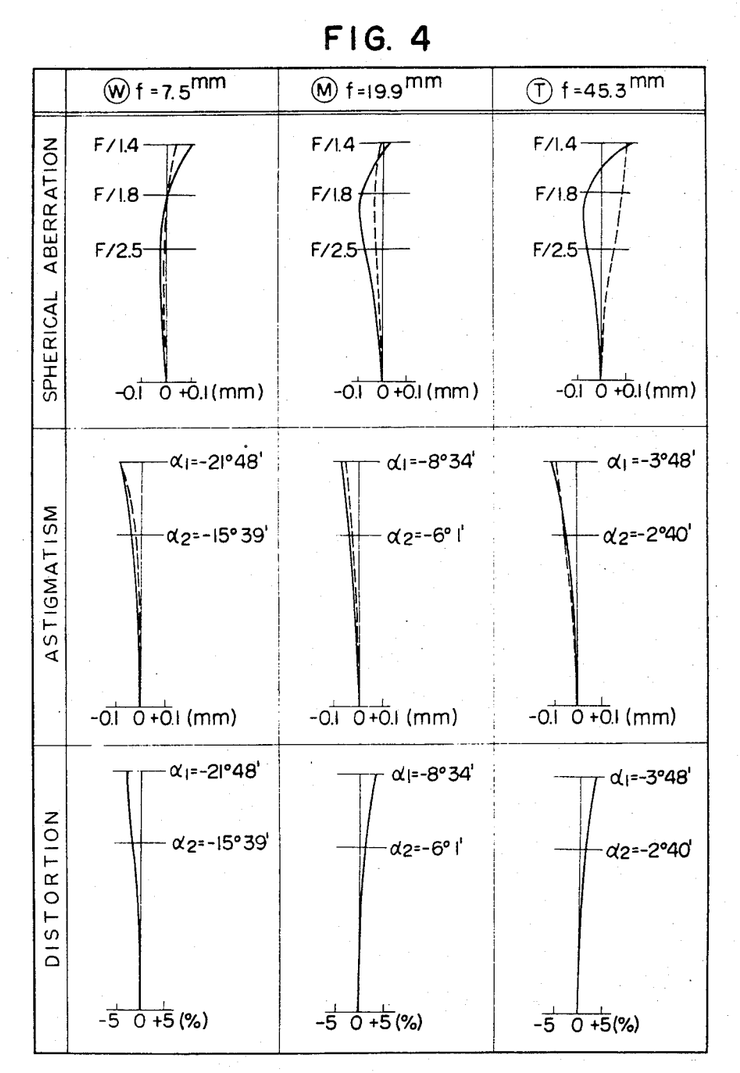
FIGURE 4 are the graphs of the spherical aberration, astigmatism, and distortion for the illustrative embodiment of the invention of FIGURE 2.

Spherical aberration, astigmatism and distortion of the illustrative form of embodiment are shown in the graphs of FIGURE 4, for each the minimum focal length position W of the zoom objective of the invention, the median focal length position M thereof, and for its telephoto position T.

In Example 2, $x=17.96$ and $y=46.59$

When the above values of Example 2 are substituted into the conditions 11 through 15 the following result is obtained.

$$65.751 < 111.83 < 114.534 \quad (11)$$

$$19.089 < 31.59 < 33.936 \quad (12)$$

$$28.431 < 87.1812 < 91.611 \quad (13)$$

$$26.1544 < 64.55 < 69.7450 \quad (14)$$

$$17.96 > 9.318 \quad (15)$$

EXAMPLE 2
[F: 13.3 mm.–161.8 mm.; F: 2.5; Zoom ratio 12.5]

| Component with focal length | Radius of curvature | Lens thickness or air space | | | Index of refraction | Abbé number |
|---|---|---|---|---|---|---|
| | | W | M | T | | |
| I ($f_1$ 111.83) | $r_1 = +152.000$ | $d_1 = 1.6$ | | | $n_1 = 1.78502$ | $v_1 = 25.9$ |
| | $r_2 = +69.600$ | $d_2 = 10.6$ | | | $n_2 = 1.57257$ | $v_2 = 57.7$ |
| | $r_3 = -403.159$ | $d_3 = 0.1$ | | | | |
| | $r_4 = +77.440$ | $d_4 = 6.0$ | | | $n_3 = 1.51813$ | $v_3 = 58.8$ |
| | $r_5 = +427.984$ | $d_5 = 0.61$ | 34.42 | 65.16 | | |
| II ($f_2$ −21.21) | $r_6 = +255.060$ | $d_6 = 0.9$ | | | $n_4 = 1.65925$ | $v_4 = 57.5$ |
| | $r_7 = +35.800$ | $d_7 = 2.8$ | | | | |
| | $r_8 = +187.106$ | $d_8 = 0.9$ | | | $n_5 = 1.65925$ | $v_5 = 57.5$ |
| | $r_9 = +30.000$ | $d_9 = 5.0$ | | | | |
| | $r_{10} = -49.500$ | $d_{10} = 0.6$ | | | $n_6 = 1.51824$ | $v_6 = 70.1$ |
| | $r_{11} = +29.152$ | $d_{11} = 3.4$ | | | $n_7 = 1.74076$ | $v_7 = 27.7$ |
| | $r_{12} = +113.187$ | $d_{12} = 66.92$ | 33.11 | 2.37 | | |
| III ($f_3$ 31.59) | $r_{13} = +94.698$ | $d_{13} = 3.2$ | | | $n_8 = 1.62593$ | $v_8 = 35.7$ |
| | $r_{14} = -124.950$ | $d_{14} = 0.1$ | | | | |
| | $r_{15} = +94.698$ | $d_{15} = 3.2$ | | | $n_9 = 1.62593$ | $v_9 = 35.7$ |
| | $r_{16} = -124.950$ | $d_{16} = 0.1$ | | | | |
| | $r_{17} = +70.000$ | $d_{17} = 8.1$ | | | $n_{10} = 1.74443$ | $v_{10} = 49.4$ |
| | $r_{18} = -24.300$ | $d_{18} = 1.1$ | | | $n_{11} = 1.78431$ | $v_{11} = 25.9$ |
| | $r_{19} = -13,201.513$ | $d_{19} = 4.24$ | 14.19 | 22.20 | | |
| IV ($f_4$ 44.09) | $r_{20} = -33.000$ | $d_{20} = 21.2$ | | | $n_{12} = 1.71284$ | $v_{12} = 53.8$ |
| | $r_{21} = -16.385$ | $d_{21} = 3.5$ | | | $n_{13} = 1.57109$ | $v_{13} = 51.0$ |
| | $r_{22} = +24.000$ | $d_{22} = 6.2$ | | | | |
| | $r_{23} = +180.000$ | $d_{23} = 4.4$ | | | $n_{14} = 1.46377$ | $v_{14} = 65.4$ |
| | $r_{24} = -32.520$ | $d_{24} = 0.3$ | | | | |
| | $r_{25} = +42.000$ | $d_{25} = 5.0$ | | | $n_{15} = 1.46798$ | $v_{15} = 66.3$ |
| | $r_{26} = -17.558$ | $d_{26} = 1.3$ | | | $n_{16} = 1.64829$ | $v_{16} = 33.8$ |
| | $r_{27} = -30.904$ | | | | | |

EXAMPLE 3

[F=51.6 mm -300.1 mm.; F=4.5; Zoom ratio 6]

| Component with focal length | Radius of curvature | Lens thickness or air space | | | Index of refraction | Abbé number |
|---|---|---|---|---|---|---|
| | | W | M | T | | |
| I($f_1$ 175.62) | $r_1 = +260.000$ | $d_1 = 2.2$ | | | $n_1 = 1.74000$ | $v_1 = 28.2$ |
| | $r_2 = +97.723$ | $d_2 = 14.8$ | | | $n_2 = 1.63854$ | $v_2 = 55.5$ |
| | $r_3 = -354.896$ | $d_3 = 0.2$ | | | | |
| | $r_4 = +99.000$ | $d_4 = 4.8$ | | | $n_3 = 1.51728$ | $v_3 = 69.6$ |
| | $r_5 = +164.233$ | $d_5 = 3.80$ | 41.80 | 78.80 | | |
| II ($f_2$ -40.54) | $r_6 = +316.250$ | $d_6 = 2.2$ | | | $n_4 = 1.69100$ | $v_4 = 54.8$ |
| | $r_7 = +42.114$ | $d_7 = 12.2$ | | | | |
| | $r_8 = -70.466$ | $d_8 = 1.3$ | | | $n_5 = 1.51728$ | $v_5 = 69.6$ |
| | $r_9 = +43.874$ | $d_9 = 6.0$ | | | $n_6 = 1.72825$ | $v_6 = 28.3$ |
| | $r_{10} = +319.905$ | $d_{10} = 75.92$ | 37.92 | 0.92 | | |
| III ($f_3$ 52.15) | $r_{11} = +143.904$ | $d_{11} = 5.0$ | | | $n_7 = 1.51728$ | $v_7 = 69.6$ |
| | $r_{12} = -143.904$ | $d_{12} = 0.2$ | | | | |
| | $r_{13} = +143.904$ | $d_{13} = 5.0$ | | | $n_8 = 1.51728$ | $v_8 = 69.6$ |
| | $r_{14} = -143.904$ | $d_{14} = 0.2$ | | | | |
| | $r_{15} = +118.750$ | $d_{15} = 12.9$ | | | $n_9 = 1.62041$ | $v_9 = 60.3$ |
| | $r_{16} = -48.680$ | $d_{16} = 1.7$ | | | $n_{10} = 1.79504$ | $v_{10} = 28.4$ |
| | $r_{17} = -209.519$ | $d_{17} = 5.06$ | 18.83 | 37.59 | | |
| IV ($f_4$ 239.63) | $r_{18} = -152.000$ | $d_{18} = 10.0$ | | | $n_{11} = 1.51728$ | $v_{11} = 69.6$ |
| | $r_{19} = +152.000$ | $d_{19} = 3.5$ | | | | |
| | $r_{20} = -152.000$ | $d_{20} = 10.0$ | | | $n_{12} = 1.51728$ | $v_{12} = 69.6$ |
| | $r_{21} = +152.000$ | $d_{21} = 2.5$ | | | | |
| | $r_{22} = -180.000$ | $d_{22} = 1.5$ | | | $n_{13} = 1.62374$ | $v_{13} = 47.0$ |
| | $r_{23} = +38.630$ | $d_{23} = 4.5$ | | | $n_{14} = 1.74077$ | $v_{14} = 27.7$ |
| | $r_{24} = +145.240$ | $d_{24} = 4.2$ | | | | |
| | $r_{25} = -900.000$ | $d_{25} = 3.2$ | | | $n_{15} = 1.66446$ | $v_{15} = 35.9$ |
| | $r_{26} = +52.700$ | $d_{26} = 14.0$ | | | $n_{16} = 1.51680$ | $v_{16} = 64.2$ |
| | $r_{27} = +48.000$ | $d_{27} = 32.0$ | | | | |
| | $r_{28} = +70.000$ | $d_{28} = 14.0$ | | | $n_{17} = 1.46450$ | $v_{17} = 65.8$ |
| | $r_{29} = -52.900$ | $d_{29} = 1.6$ | | | $n_{18} = 1.63930$ | $v_{18} = 45.0$ |
| | $r_{30} = +1585.500$ | $d_{30} = 1.0$ | | | | |
| | $r_{31} = +200.000$ | $d_{31} = 14.0$ | | | $n_{19} = 1.46450$ | $v_{19} = 65.8$ |
| | $r_{32} = -54.700$ | $d_{32} = 1.6$ | | | $n_{20} = 1.62041$ | $v_{20} = 60.3$ |
| | $r_{33} = -137.178$ | | | | | |

In Example 3, $x = 32.53$ and $y = 42.47$.

When the above values of Example 3 are substituted into the conditions 11 through 15, the following result is obtained:

$$125.674 < 175.62 < 218.916 \quad (11)$$

$$36.486 < 52.15 < 64.864 \quad (12)$$

$$46.935 < 110.0484 < 151.235 \quad (13)$$

$$33.0145 < 75.0 < 88.0387 \quad (14)$$

$$32.53 > 8.494 \quad (15)$$

The application of the design in accordance with the invention enables the provision of large aperture zoom objectives of high zoom ratio without any increase in lens size of the system or and complex cam structure being required, the objective given quality optical performance throughout the whole focussing range, and having high resolving power.

What is claimed is:

1. A large aperture zoom lens with a high zoom ratio comprising a first positive component consisting of a cemented positive doublet of a divergent lens and a convergent lens, and a single convergent lens; a second negative component consisting of a divergent lens and a cemeted negative doublet of a divergent lens and a convergent lens; a third positive component consisting of not more than two inclusive of bi-convex lenses and a cemented positive doublet of a convergent lens and a divergent lens; and a fourth fixed component; the first and third components being movable as a unit a distance $x$ while the second negative component is movable a distance $y$ in the opposite direction to that of the unit, of which the detailed data is as follows:

[F: 7.5 mm.–45.3 mm.; F: 1.4; Zoom ratio 6]

| Component with focal length | Radius of curvature | Lens thickness or air space | | | Index of refraction | Abbé number |
|---|---|---|---|---|---|---|
| | | W | M | T | | |
| I ($f_1$ 79.65) | $r_1 = +98.380$ | $d_1=1.0$ | | | $n_1=1.76182$ | $v_1=26.5$ |
| | $r_2 = +42.444$ | $d_2=7.5$ | | | $n_2=1.65830$ | $v_2=57.3$ |
| | $r_3 = -268.150$ | $d_3=0.1$ | | | | |
| | $r_4 = +63.030$ | $d_4=2.5$ | | | $n_3=1.65830$ | $v_3=57.3$ |
| | $r_5 = +117.590$ | $d_5=1.46$ | 22.59 | 36.66 | | |
| II ($f_2$ −18.17) | $r_6 = +339.000$ | $d_6=1.0$ | | | $n_4=1.69113$ | $v_4=54.8$ |
| | $r_7 = +15.900$ | $d_7=5.5$ | | | | |
| | $r_8 = -30.500$ | $d_8=0.6$ | | | $n_5=1.51690$ | $v_5=64.2$ |
| | $r_9 = +18.300$ | $d_9=3.2$ | | | $n_6=1.72825$ | $v_6=28.3$ |
| | $r_{10}=+133.239$ | $d_{10}=36.24$ | 15.11 | 1.04 | | |
| III ($f_3$ 23.12) | $r_{11}=+39.500$ | $d_{11}=2.5$ | | | $n_7=1.65866$ | $v_7=57.5$ |
| | $r_{12}=-109.500$ | $d_{12}=0.1$ | | | | |
| | $r_{13}=+39.500$ | $d_{13}=6.0$ | | | $n_8=1.65866$ | $v_8=57.5$ |
| | $r_{14}=-14.500$ | $d_{14}=0.8$ | | | $n_9=1.72479$ | $v_9=37.9$ |
| | $r_{15}=-71.313$ | $d_{15}=2.0$ | 9.21 | 14.79 | | |
| IV ($f_4$ 18.62) | $r_{16}=-18.200$ | $d_{16}=6.0$ | | | $n_{10}=1.57501$ | $v_{10}=41.3$ |
| | $r_{17}=\infty$ | $d_{17}=3.5$ | | | | |
| | $r_{18}=-64.559$ | $d_{18}=3.5$ | | | $n_{11}=1.62041$ | $v_{11}=60.3$ |
| | $r_{19}=-23.000$ | $d_{19}=0.1$ | | | | |
| | $r_{20}=-64.559$ | $d_{20}=3.5$ | | | $n_{12}=1.62041$ | $v_{12}=60.3$ |
| | $r_{21}=-23.000$ | $d_{21}=0.1$ | | | | |
| | $r_{22}=+15.500$ | $d_{22}=4.0$ | | | $n_{13}=1.58938$ | $v_{13}=61.3$ |
| | $r_{23}=-12.500$ | $d_{23}=1.4$ | | | $n_{14}=1.69895$ | $v_{14}=30.1$ |
| | $r_{24}=+184.974$ | | | | | | where $r_1, r_2 \ldots r_{24}$ denote radii of curvature of respective lenses from object to image side;

$d_1, d_2 \ldots d_{23}$ thicknesses of and air spacings between respective lenses along the optical axis in said order;

$n_1, n_2 \ldots n_{14}$ refractive indices of respective glass materials for the D line of spectrum in said order;

$v_1, v_2 \ldots v_{14}$ Abbé numbers for said glass materials in said order;

and the lens proportionally increase or decrease the dimensions such as for example, local length thereof.

2. A large aperture zoom lens with a high zoom ratio comprising a first positive component consisting of a cemented positive doublet of a divergent lens and a convergent lens, and a single convergent lens; a second negative component consisting of a divergent lens and a cemented negative doublet of a divergent lens and a convergent lens; a third positive component consisting of not more than two inclusive of bi-convex lenses and a cemented positive doublet of a convergent lens and a divergent lens; and a fourth fixed component; the first and third positive components being movable as a unit a distance $x$ while the second negative component is movable a distance $y$ in the opposite direction to that of the unit, of which the detailed data is as follows:

[F: 13.3 mm.-161.8 mm.; F: 2.5; Zoom ratio 12.5]

| Component with focal length | Radius of curvature | Lens thickness or air space | | | Index of refraction | Abbé number |
|---|---|---|---|---|---|---|
| | | W | M | T | | |
| I($f_1$ 111.83) | $r_1=+152.000$ | $d_1=1.6$ | | | $n_1=1.78502$ | $v_1=25.9$ |
| | $r_2=+69.600$ | $d_2=10.6$ | | | $n_2=1.57257$ | $v_2=57.7$ |
| | $r_3=-403.159$ | $d_3=0.1$ | | | | |
| | $r_4=+77.440$ | $d_4=6.0$ | | | $n_3=1.51813$ | $v_3=58.8$ |
| | $r_5=+427.984$ | $d_5=0.61$ | 34.42 | 65.16 | | |
| II ($f_2$ −21.21) | $r_6=+255.060$ | $d_6=0.9$ | | | $n_4=1.65925$ | $v_4=57.5$ |
| | $r_7=+35.800$ | $d_7=2.8$ | | | | |
| | $r_8=+187.106$ | $d_8=0.9$ | | | $n_5=1.65925$ | $v_5=57.5$ |
| | $r_9=+30.000$ | $d_9=5.0$ | | | | |
| | $r_{10}=-49.500$ | $d_{10}=0.6$ | | | $n_6=1.51824$ | $v_6=70.1$ |
| | $r_{11}=+29.152$ | $d_{11}=3.4$ | | | $n_7=1.74076$ | $v_7=27.7$ |
| | $r_{12}=+113.187$ | $d_{12}=66.92$ | 33.11 | 2.37 | | |
| III ($f_3$ 31.59) | $r_{13}=+94.698$ | $d_{13}=3.2$ | | | $n_8=1.62593$ | $v_8=35.7$ |
| | $r_{14}=-124.950$ | $d_{14}=0.1$ | | | | |
| | $r_{15}=+94.698$ | $d_{15}=3.2$ | | | $n_9=1.62593$ | $v_9=35.7$ |
| | $r_{16}=-124.950$ | $d_{16}=0.1$ | | | | |
| | $r_{17}=+70.000$ | $d_{17}=8.1$ | | | $n_{10}=1.74443$ | $v_{10}=49.4$ |
| | $r_{18}=-24.300$ | $d_{18}=1.1$ | | | $n_{11}=1.78431$ | $v_{11}=25.9$ |
| | $r_{19}=-13,201.513$ | $d_{19}=4.24$ | 14.19 | 22.20 | | |
| IV ($f_4$ 44.09) | $r_{20}=-33.000$ | $d_{20}=21.2$ | | | $n_{12}=1.71284$ | $v_{12}=53.8$ |
| | $r_{21}=-16.385$ | $d_{21}=3.5$ | | | $n_{13}=1.57109$ | $v_{13}=51.0$ |
| | $r_{22}=+24.000$ | $d_{22}=6.2$ | | | | |
| | $r_{23}=+180.000$ | $d_{23}=4.4$ | | | $n_{14}=1.46377$ | $v_{14}=65.4$ |
| | $r_{24}=-32.520$ | $d_{24}=0.3$ | | | | |
| | $r_{25}=+42.000$ | $d_{25}=5.0$ | | | $n_{15}=1.46798$ | $v_{15}=66.3$ |
| | $r_{26}=-17.558$ | $d_{26}=1.3$ | | | $n_{16}=1.64829$ | $v_{16}=33.8$ |
| | $r_{27}=-30.904$ | | | | | | where $r_1, r_2 \ldots r_{27}$ denote radii of curvature of respective lenses from object to image side;

$d_1, d_2 \ldots d_{26}$ thicknesses of and air spacings between respective lenses along the optical axis in said order;

$n_1, n_2 \ldots n_{16}$ refractive indices of respective glass materials for the D line of spectrum in said order;

$v_1, v_2 \ldots v_{16}$ Abbe numbers for said glass material in said order;

and the lens proportionately increases or decreases the dimensions such as for example, the focal length thereof.

3. A large aperture zoom lens with a high zoom ratio comprising a first positive component consisting of a cemented positive doublet of a divergent lens and a convergent lens, and a single convergent lens; a second negative component consisting of a divergent lens and a cemented negative doublet of a divergent lens and a convergent lens; a third positive component consisting of not more than two inclusive of bi-convex lenses and a cemented positive doublet of a convergent lens and a divergent lens; and a fourth fixed component; the first and third positive components being movable as a unit a distance $x$ while the second negative component is movable a distance y in the opposite direction to that of the unit, of which the detailed data is as follows:

[F=51.6 mm.-300.1 mm.; F:=4.5; Zoom ratio 6]

| Component with focal length | Radius of curvature | Lens thickness or air space | | | Index of refraction | Abbé number |
|---|---|---|---|---|---|---|
| | | W | M | T | | |
| I($f_1$ 175.62) | $r_1 = +260.000$ | $d_1 = 2.2$ | | | $n_1 = 1.74000$ | $v_1 = 28.2$ |
| | $r_2 = +97.723$ | $d_2 = 14.8$ | | | $n_2 = 1.63854$ | $v_2 = 55.5$ |
| | $r_3 = -354.896$ | $d_3 = 0.2$ | | | | |
| | $r_4 = +99.000$ | $d_4 = 4.8$ | | | $n_3 = 1.51728$ | $v_3 = 69.6$ |
| | $r_5 = +164.233$ | $d_5 = 3.80$ | 41.80 | 78.80 | | |
| II ($f_2$ −40.54) | $r_6 = +316.250$ | $d_6 = 2.2$ | | | $n_4 = 1.69100$ | $v_4 = 54.8$ |
| | $r_7 = +42.114$ | $d_7 = 12.2$ | | | | |
| | $r_8 = -70.466$ | $d_8 = 1.3$ | | | $n_5 = 1.51728$ | $v_5 = 69.6$ |
| | $r_9 = +43.874$ | $d_9 = 6.0$ | | | $n_6 = 1.72825$ | $v_6 = 28.3$ |
| | $r_{10} = +319.905$ | $d_{10} = 75.92$ | 37.92 | 0.92 | | |
| III ($f_3$ 52.15) | $r_{11} = +143.904$ | $d_{11} = 5.0$ | | | $n_7 = 1.51728$ | $v_7 = 69.6$ |
| | $r_{12} = -143.904$ | $d_{12} = 0.2$ | | | | |
| | $r_{13} = +143.904$ | $d_{13} = 5.0$ | | | $n_8 = 1.51728$ | $v_8 = 69.6$ |
| | $r_{14} = -143.904$ | $d_{14} = 0.2$ | | | | |
| | $r_{15} = +118.750$ | $d_{15} = 12.9$ | | | $n_9 = 1.62041$ | $v_9 = 60.3$ |
| | $r_{16} = -48.680$ | $d_{16} = 1.7$ | | | $n_{10} = 1.79504$ | $v_{10} = 28.4$ |
| | $r_{17} = -209.519$ | $d_{17} = 5.06$ | 18.83 | 37.59 | | |
| IV ($f_4$ 239.62) | $r_{18} = -152.000$ | $d_{18} = 10.0$ | | | $n_{11} = 1.51728$ | $v_{11} = 69.6$ |
| | $r_{19} = +152.000$ | $d_{19} = 3.5$ | | | | |
| | $r_{20} = -152.000$ | $d_{20} = 10.0$ | | | $n_{12} = 1.51728$ | $v_{12} = 69.6$ |
| | $r_{21} = +152.000$ | $d_{21} = 2.5$ | | | | |
| | $r_{22} = -180.000$ | $d_{22} = 1.5$ | | | $n_{13} = 1.62374$ | $v_{13} = 47.0$ |
| | $r_{23} = +38.630$ | $d_{23} = 4.5$ | | | $n_{14} = 1.74077$ | $v_{14} = 27.7$ |
| | $r_{24} = +145.240$ | $d_{24} = 4.2$ | | | | |
| | $r_{25} = -900.000$ | $d_{25} = 3.2$ | | | $n_{15} = 1.66446$ | $v_{15} = 35.9$ |
| | $r_{26} = +52.700$ | $d_{26} = 14.0$ | | | $n_{16} = 1.51680$ | $v_{16} = 64.2$ |
| | $r_{27} = -48.000$ | $d_{27} = 32.0$ | | | | |
| | $r_{28} = +70.000$ | $d_{28} = 14.0$ | | | $n_{17} = 1.46450$ | $v_{17} = 65.8$ |
| | $r_{29} = -52.900$ | $d_{29} = 1.6$ | | | $n_{18} = 1.63930$ | $v_{18} = 45.0$ |
| | $r_{30} = +1,585.500$ | $d_{30} = 1.0$ | | | | |
| | $r_{31} = +200.000$ | $d_{31} = 14.0$ | | | $n_{19} = 1.46450$ | $v_{19} = 65.8$ |
| | $r_{32} = -54.700$ | $d_{32} = 1.6$ | | | $n_{20} = 1.62041$ | $v_{20} = 60.3$ |
| | $r_{33} = -137.178$ | | | | | | where $r_1, r_2 \ldots r_{33}$ denote radii of curvature of respective lenses from object to image side;

$d_1, d_2 \ldots d_{32}$ thicknesses of and air spacings between respective lenses along the optical axis in said order;

$n_1, n_2 \ldots n_{20}$ refractive indices of respective glass materials for the D line of spectrum in said order;

$v_1, v_2 \ldots v_{20}$ Abbe number for said glass materials in said order;

and the lens proportionately increases or decreases the dimensions such as for example, the focal length thereof.

References Cited

UNITED STATES PATENTS 3,192,829   7/1965   Yamaji _____________ 350—186
3,316,051   4/1967   Baluteau ___________ 350—184

FOREIGN PATENTS 1,315,029   12/1962   France.

JOHN K. CORBIN, Primary Examiner

U.S. Cl. X.R.

350—214